United States Patent [19]

Stevens et al.

[11] Patent Number: 5,870,755
[45] Date of Patent: Feb. 9, 1999

[54] METHOD AND APPARATUS FOR CAPTURING AND PRESENTING DIGITAL DATA IN A SYNTHETIC INTERVIEW

[75] Inventors: Scott M. Stevens, Pittsburgh; Michael G. Christel, Wexford, both of Pa.

[73] Assignee: Carnegie Mellon University, Pittsburgh, Pa.

[21] Appl. No.: 806,926

[22] Filed: Feb. 26, 1997

[51] Int. Cl.[6] .................................................. G06F 17/30
[52] U.S. Cl. ............................................ 707/104; 706/59
[58] Field of Search ............................... 707/104; 706/59, 706/45

[56] References Cited

U.S. PATENT DOCUMENTS

| | | | |
|---|---|---|---|
| 4,954,699 | 9/1990 | Coffey et al. | 235/462 |
| 5,006,987 | 4/1991 | Harless | 434/323 |
| 5,218,535 | 6/1993 | Pietrowski | 434/323 |
| 5,307,446 | 4/1994 | Araki et al. | 706/59 |
| 5,384,894 | 1/1995 | Vassiliadis et al. | 706/52 |
| 5,517,405 | 5/1996 | McAndrew et al. | 706/45 |
| 5,730,603 | 3/1998 | Harless | 434/308 |
| 5,765,138 | 6/1998 | Aycock et al. | 705/7 |

OTHER PUBLICATIONS

Christel et al., Amore: the Advanced Multimedia Organizer for Requirements Elicitation CMU/SEI 93 –TR–12 (1993).
Stevens "Multimedia Computing: Applications, Designs and Human Factors", In Bass and Dewan, Ed. User Interface Software, N.Y., N.Y., (1993).
Stevens "Informedia, Improving Access to Digital Video," in Interactions, Oct. 1994, vol. 1, No. 1, pp. 67–71.
Wactlar, et al., "Intelligent Access to Digital Video: Informedia Project", Computer, vol. 29, No. 5, pp. 46–52 (May 1996).
Christel et al., "Rule Base and Digital Video Technologies Applied to Training Simulations", Software Engineering Institute Technical Review '92, Pgh, PA: Software Engineering Institute (1992).
Stevens, "Intelligent Interactive Video Simulation of a Code Inspection", Communications of the ACM, vol. 32, No. 7, pp. 832–843 (Jul. 1989).
Wood, et al. "A Multimedia Approach to Requirements Capture and Modeling", in Proceedings of the First International Conference on Requirements Engineering, Colorado Springs (Apr. 18–22, 1994).
A.C. Siochi and R.W. Ehrich, "Computer analysis of user interfaces based on repetition in transcripts of user sessions," ACM Trans. on Information Systems, vol. 9, No. 4, pp. 309–335, Oct. 1991.
G.G. Shephard and C.W. Kirkwood, "Managing the Judgemental Probability Elicitation Process: A Case Study of Analyst/Manager Interaction," IEEE Trans. on Engineering Management, vol. 41, No. 4, pp. 414–425, Nov. 1994.
J. Leite and A. Gilvaz, "Requirements Elicitation Driven by Interviews: The Use of Viewpoints," Proc. 8th Int'l. Workshop on Software Specification and Design, pp. 85–94, Mar. 1996.
A Spink, et al., "Elicitation During Information Retrieval: Implications for IR System Design," Proc. 19th Annual Int'l. ACM SIGIR Conference on Research and Development in Information Retrieval, pp. 120–127, Dec. 1996.

Primary Examiner—Robert W. Downs
Attorney, Agent, or Firm—Kirkpatrick & Lockhart LLP

[57] ABSTRACT

A method of creating a database for facilitating a synthetic interview begins with the step of generating questions. The questions and responses to the questions are recorded. A transcript of the recorded questions and responses is created. An association between each question and the response thereto is maintained. Each of the responses and each of the questions is expanded with semantic information. Inverted indices are created for the semantic expansions of the responses, the questions, and the transcripts of the responses and questions to enable retrieval of the recorded responses in a seamless manner. A method is also disclosed for creating a database for creating a synthetic interview from existing material.

20 Claims, 7 Drawing Sheets

FIG. 7 ered with various domain information. The domain information is encoded in the form of rules. An artificial intelligence system, once encoded with domain information, can perform numerous tasks, such as performing a diagnosis, identifying possible malfunctions in an engine, etc. However, coding the domain information is difficult and expensive. The domain expert
METHOD AND APPARATUS FOR CAPTURING AND PRESENTING DIGITAL DATA IN A SYNTHETIC INTERVIEW

BACKGROUND OF THE INVENTION

1. Field of the Invention

The present invention is directed generally to a system and method for retrieving digital video, digital audio, and digital text data. The present invention is directed more particularly to a system and method for capturing and accessing video data in a manner so as to give the user the impression that they are communicating with an embodiment of the individual, i.e., interacting virtually with the subject.

2. Description of the Background

The ability to convey information represents an extremely important aspect of our society. With the advent of multimedia, numerous methods of presenting information to those who need to learn the information are being advanced. Studies by the Armed Services have shown that students learn material more fully and in less time with interactive video, even when compared and contrasted with computer-based training. In one Army study, three groups of students took a course on missile electronic troubleshooting. One group took a standard lecture course, one a computer-based training course, and one an interactive video course. After the courses, the students were given actual system faults to troubleshoot. The lecture group solved 25 per cent of the faults. Both the computer-based training group and the interactive video group found 100 per cent of the faults. However, the classroom and computer-based training groups took about the same amount of time to find the faults, whereas the group trained with interactive video found the faults in one-half the time of the other two groups.

In another study, an intelligent tutoring system for electronic troubleshooting gave technicians with twenty hours training on the system the equivalent of four years of on the job training. Studies in other domains have consistently found similar results. Clearly, the use of interactive video and/or intelligent tutoring systems provides a substantial advance over standard lecture courses or passively watching a program in a linear manner.

The need for technological solutions to learning has led to the development of intelligent interactive video simulations. In an article authored by one of the present inventors entitled "Intelligent Interactive Video Simulation of a Code Inspection", appearing in Communications of the ACM, Volume 32, No. 7, pages 832 through 843, July 1989, the inventor discusses the preparation of a video simulation and the results achieved therefrom. The purpose of the video simulation is to provide a tightly scripted environment in which questions and answers are prepared and actors act out various characters providing the answers. While the use of such video simulations can provide substantial benefits over traditional classroom study, their preparation is very expensive in terms of scripting the questions and answers and then acting out the answers.

Another method of presenting information to an end user involves the use of artificial intelligence. Artificial intelligence shells can be purchased and encoded with various domain information. The domain information is encoded in the form of rules. An artificial intelligence system, once encoded with domain information, can perform numerous tasks, such as performing a diagnosis, identifying possible malfunctions in an engine, etc. However, coding the domain information is difficult and expensive. The domain expert must spend a substantial amount of time with a knowledge engineer explaining to the knowledge engineer how the domain expert performs his functions. Thereafter, that information must be carefully coded by the knowledge engineer into a series of complex rules. Thus, the need exists for a simple method of gathering domain information and presenting that information in an interactive manner so as to convey the information in a manner which can be readily learned.

SUMMARY OF THE INVENTION

The present invention is a technology and technique that creates an anthropomorphic interface into multimedia data of a particular kind, e.g., video of a person responding to questions and thus interacting with another person. The present invention is also directed to a system and method for capturing and accessing video data in such a fashion as to intelligently present an individual's or character's responses to questions. The responses of the interviewee are presented in such a way as to simulate the experience of interviewing the interviewee and giving the user the impression they are communicating with an embodiment of the individual (a persona).

The present invention includes a method of processing recorded data for facilitating a synthetic interview therefrom comprising the steps of creating a transcript of the recorded data. Statements in the recorded data are identified and a question is associated with each of the statements. The statements and the questions may be annotated with semantic information. Inverted indices of the questions, the semantic expansions of the questions and statements, and of the transcript of the recorded data are prepared to enable seamless retrieval of an appropriate statement responsive to a question.

The method of the present invention also includes creating a database for facilitating a synthetic interview. That method is comprised of generating questions. The questions and responses to the questions are then recorded. A transcript of the recorded questions and responses is created. An association between each question and the response thereto is maintained. Each of the responses and each of the questions is expanded with semantic information. Inverted indices are created for the semantic expansions of the responses, the questions, and the transcripts of the responses and questions to enable retrieval of the recorded responses in a seamless manner.

The present invention is also directed to a method of retrieving statements from a database in response to a question. The database contains indexed questions, statements responsive to the questions, and semantic expansions of the questions and statements. The retrieval method is comprised of the steps of receiving a query. The indexed questions are searched for matches, and each match is weighted. The indexed statements are searched for matches, and each match is weighted. The indexed semantic expansion of the questions is searched for matches and each match is weighted. The indexed semantic expansion of the statements is searched for matches, and each match is weighted. The best match from the question search, statement search, and semantic expansion searches is selected. The weights from the selected best matches may be compared and the statement associated with the search producing the highest weight is displayed. Pool statements may be added to the database to facilitate seamless retrieval.

With sufficient data in the form of interviews, news conferences, or scripted statements, it is possible to construct a simulated interview interface in which the user interacts virtually with the subject. That enables a more interesting personal experience than simply linearly watching an interview conducted by others. The present invention allows the user to ask several persona for their opinions and even permits persona to interact with one another.

The present invention permits knowledge to be captured in a new form. Unlike expert systems, wherein complex rules are generated from interviews, or simple videotaped interviews, where linear playback is the principle mode of access, the present invention provides a powerful method to query natural data types. The present invention enables domain information to be quickly captured without the need or knowledge of coding or rules. The present invention also enables domain information to be captured naturally in a loosely scripted setting thereby enabling the rapid and inexpensive construction of a database. Those and other advantages and benefits of the present invention will be apparent from the Description of the Preferred Embodiments herein below.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Figure 1:
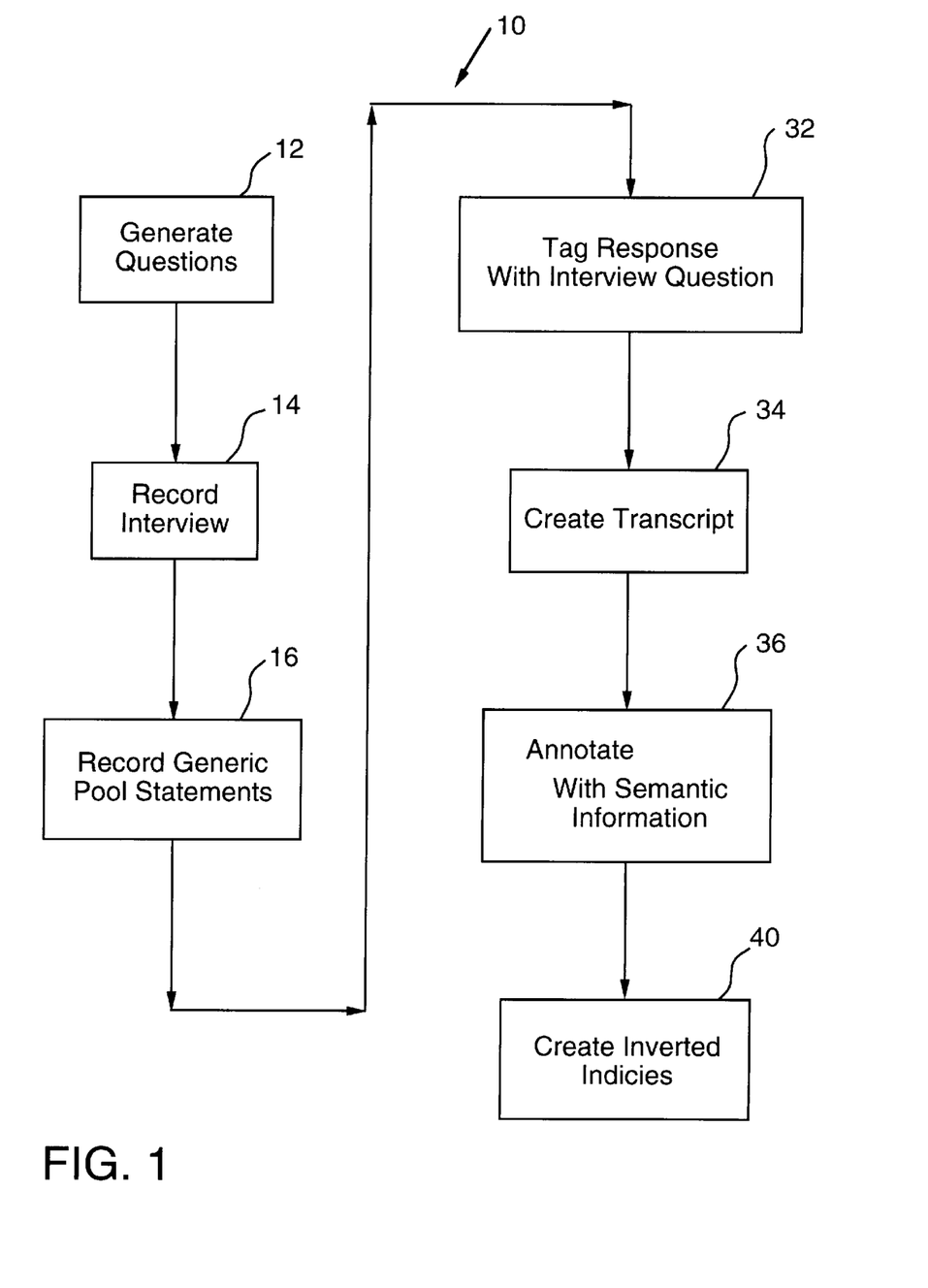
FIG. 1 is a high level block diagram illustrating the steps of the method of the present invention which may be carried out to produce a database of the type used to conduct a synthetic interview.

FIG. 1 is a high level block diagram illustrating the steps of a method 10 of the present invention which may be carried out to produce a database needed to conduct a synthetic interview. The first step 12 of the method is to generate questions for the interviewee. The questions may be domain-specific. For example, if a neurosurgeon is being interviewed, the questions may be typical questions which a neurosurgeon would be asked during a consultation with another neurosurgeon. Alternatively, the focus of the interview may be changed by generating questions of the type which a patient or a member of a patient's family might ask of a neurosurgeon prior to the performance of a particular surgical technique.

After the list of questions is generated at step 12, the interview is recorded at step 14. A significant aspect of the present invention which differs from the prior art is that the responses of the interviewee are not scripted. The interviewee merely answers the questions using conversational English in the way that the question would be answered if posed by another neurosurgeon, a prospective patient, etc. Additionally, the answer which the neurosurgeon provides may raise additional questions which may be spontaneously asked and answered. In that manner, a substantial savings of time is realized by eliminating the need for tightly scripting questions and answers.

At step 16, generic pool statements are recorded. Pool statements are statements which may be used in the event that a question is asked for which no answer is available in the database or for which some type of specialized answer is required. For example:

That's an interesting question. Let me think about that and get back to you.

You've already asked me that question; I have nothing to add to my previous answer.

Pool statements may be also used to keep the synthetic interview moving. For example:

Why don't you ask me about my experience?

Would you like to talk about the surgical procedure?

The generic pool statements represent another advance over the prior art in that they provide a degree of realism not found in prior art systems.

Figure 2:
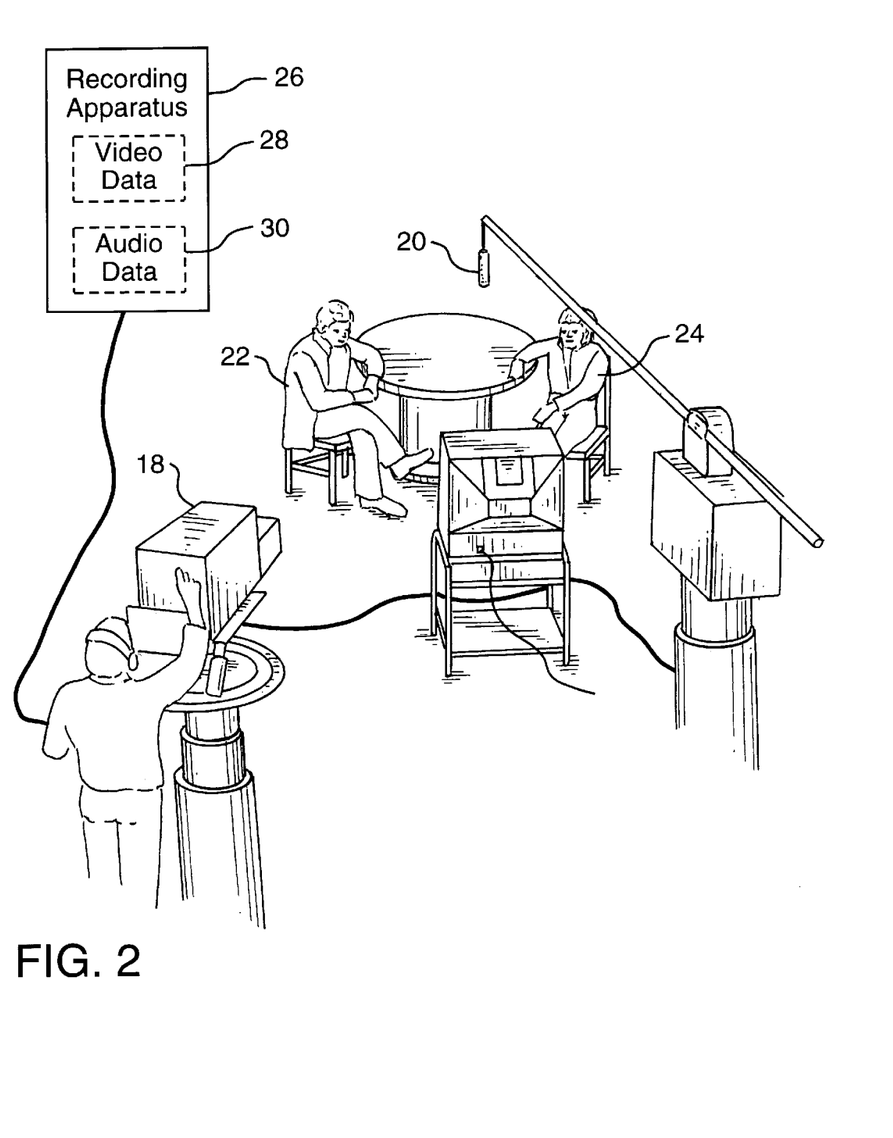
FIG. 2 illustrates a studio of the type which may be used to carry out certain steps of the method of FIG. 1.

The steps 14 and 16 may be carried out using any type of conventional recording equipment. For example, in FIG. 2, a camera 18 and a microphone 20 are used to capture the conversation between an interviewer 22 and an interviewee 24. The captured audio and video is recorded by a conventional recording apparatus 26 to produce analog video data 28 and analog audio data 30.

Returning to FIG. 1, after the interview has been recorded, or during the recording of the interview, the responses are tagged so as to be identifiable with the appropriate question. That can be accomplished either automatically, for example, using an automated speech recognition system such as the Sphinx recognition software to recognize a speaker change, or manually by associating the question asked to the multimedia object—interviewee response.

Other information may be associated with the question and response. For example, the response may refer to a CAT scan, and a link to the CAT scan provided so that the user can retrieve the image when the interviewee refers to it. Any type of material-text, image, other video, audio, etc. can be associated with the question/response to take full advantage of the type of rich responses that can be produced using multimedia techniques.

At step 34, a transcript is created. A separate transcript of the questions and a separate transcript of the responses may be prepared based on speaker changes. Furthermore, because the questions, or at least some of the questions, have been generated beforehand at step 12, those materials may be used to check or correct the transcript of the questions generated at step 34.

At step 36, both the question and response are annotated or expanded with semantic information. That can be done either manually or automatically. Weights are also associated with the various expansions. For example, parsing the sentence "When will Mars be colonized?" to extract nouns and verbs and applying a dictionary and thesaurus function might yield the following semantic expansion "planet, planetary, resettle, colonies, colony, colonization" as additional words to index and associate with the question. Additional manual expansion might add "Might humans ever live on Mars?" Applying manual or automatic translation would yield similar information in multiple languages, such as French, Japanese, German, Italian, etc.

Similar expansion of the original response "I believe it will be colonized within a century" could provide "One hundred years", and translations thereof into multiple languages.

Figure 3:
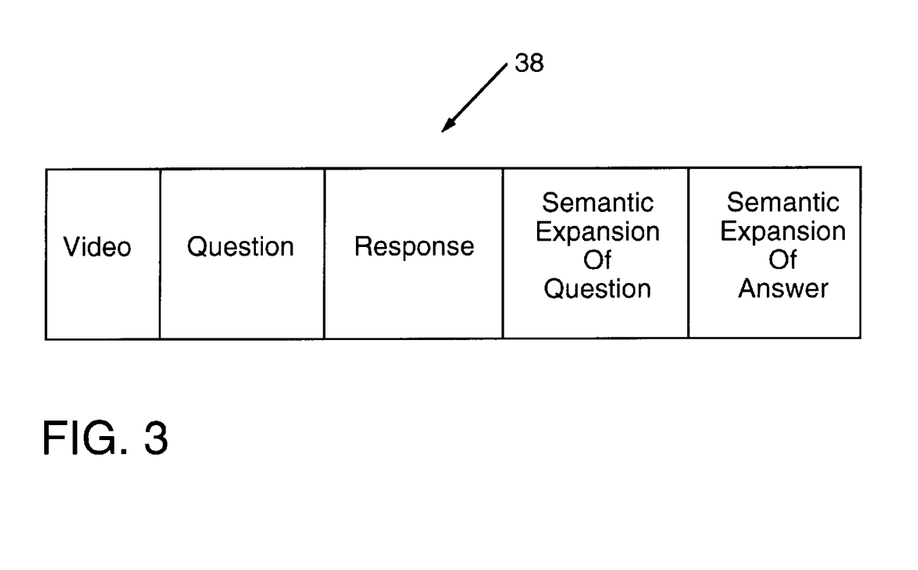
FIG. 3 illustrates a compound object created by the method of the present invention; the compound object is indexed to create a searchable database.

The multimedia response (digital video, audio, text, etc.), original question, original response, semantically expanded question, and semantically expanded answer form a compound object 38 illustrated in FIG. 3 for indexing. Our indexing method is to create inverted indices at step 40. An inverted index is created for the questions, responses, semantic expansions of the questions, and semantic expansions of the responses. The inverted indices are stored in a manner well known in the art so as to enable retrieval of a response to a question as will be described further hereinbelow.

Figure 4:
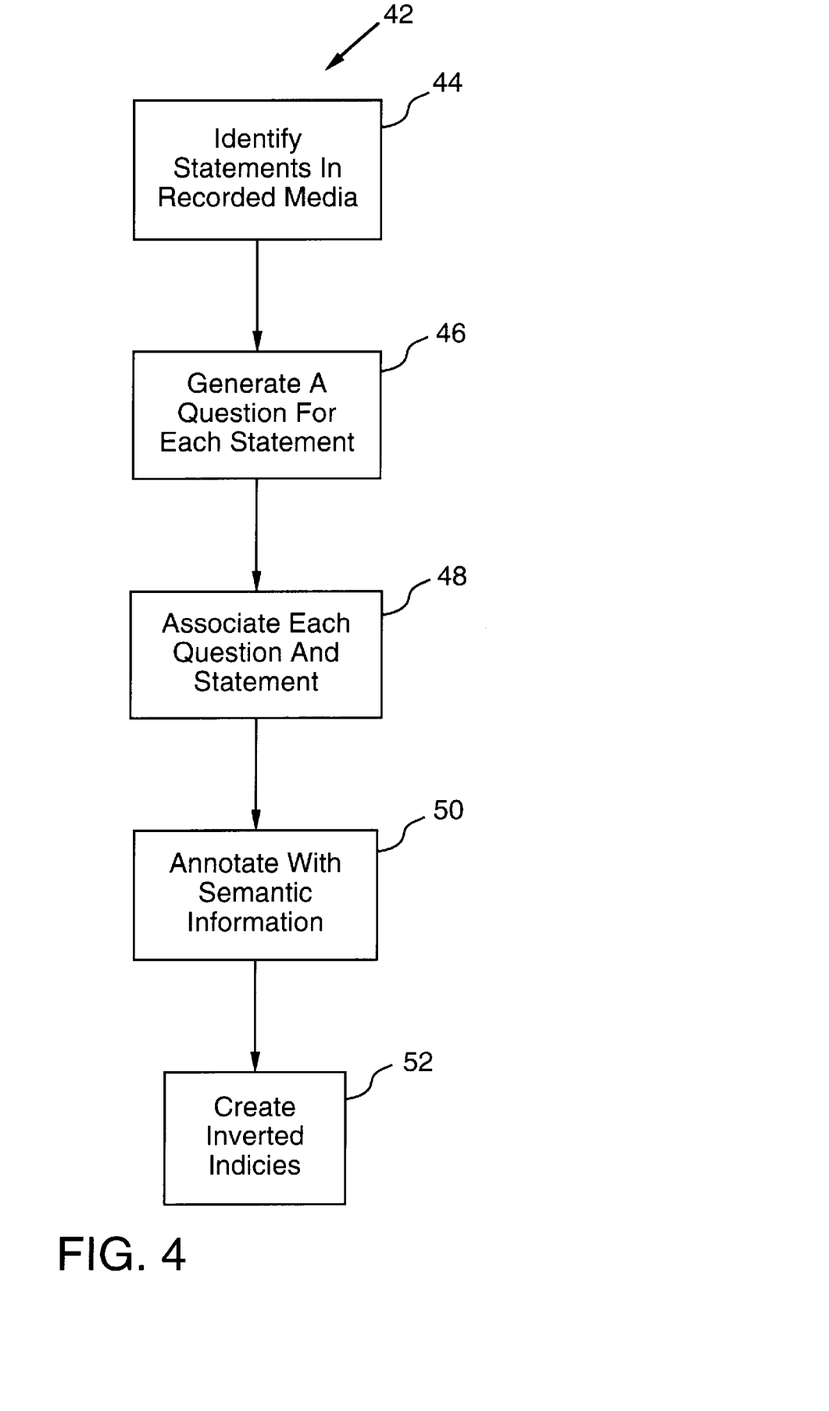
FIG. 4 is a block diagram illustrating the steps of another method of the present invention in which a database of the type used to conduct a synthetic interview may be constructed from pre-existing video material.

The inventors have recognized that a wealth of prerecorded information already exists. Illustrated in FIG. 4 is a high level block diagram illustrating the steps of another method 42 of the present invention in which a database of the type needed to conduct a synthetic interview is constructed from pre-existing video material. The method 42 illustrated in FIG. 4 not only enables a wealth of pre-existing material to be used, but enables the creation of a database whereby a synthetic interview can be carried out with a deceased individual.

In FIG. 4, the method 42 begins with step 44 in which the recorded information or a transcript of the recorded information is reviewed and statements in the recorded information are identified. The step 44 may be carried out either manually or automatically. After statements have been identified, an appropriate question for which each statement is an answer is generated at step 46. At step 48, each question is associated with the statement which is the answer for that question. Thereafter, at step 50, both the questions and statements are annotated with semantic information. At step 52, an inverted index of the transcript of the recorded information, i.e., the statements, an inverted index of the questions, an inverted index of the semantic expansion of the statements, and an inverted index of the semantic expansion of the questions are created. Similar to method 10, it is not critical in method 42 when the transcript is prepared, although it must be prepared before step 52 is performed. Thereafter, the database is ready for searching. The database constructed according to the method 42 set forth in FIG. 4 may not include pool statements unless such statements can be found in the prerecorded information or unless they are inserted by a narrator.

Figure 5:
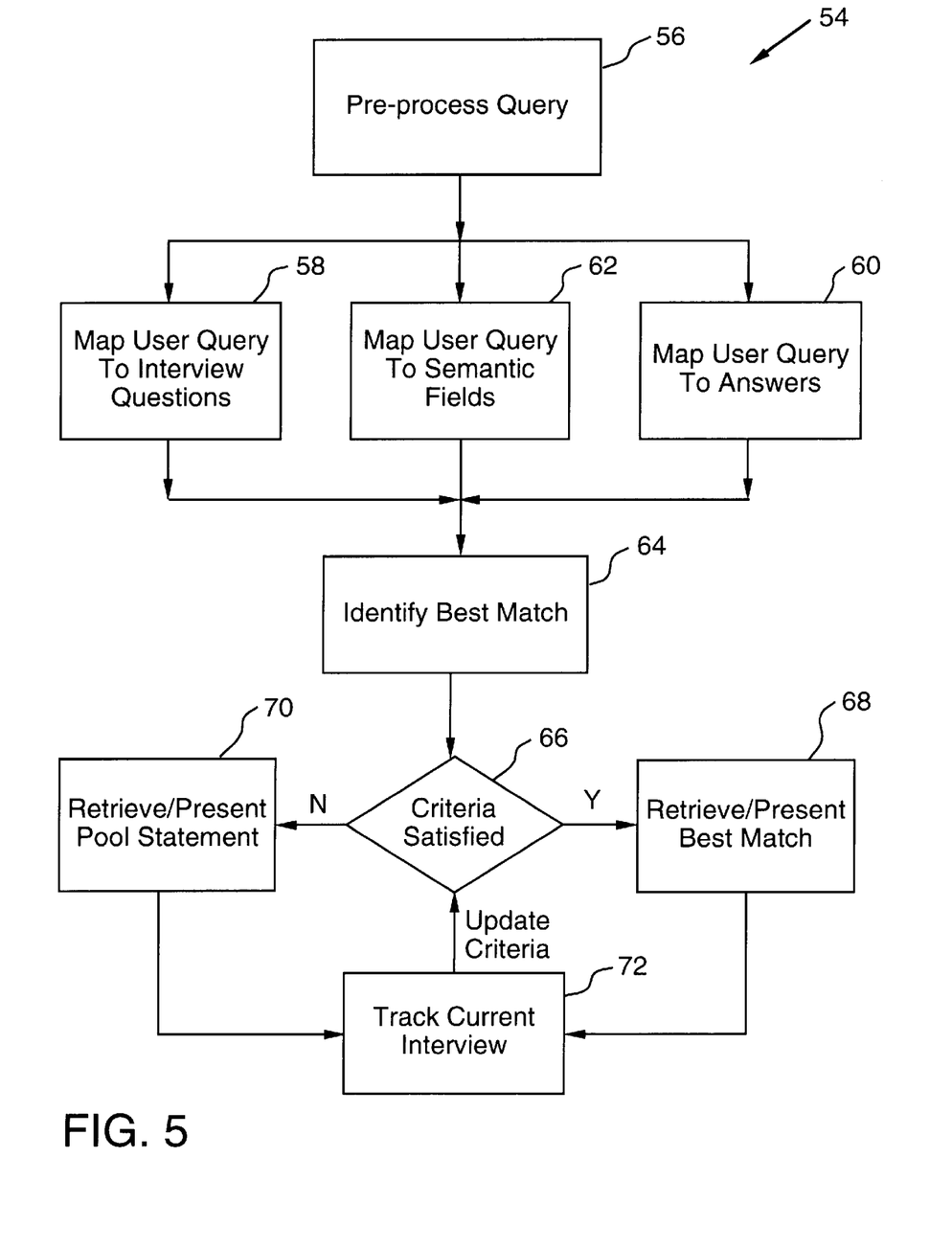
FIG. 5 is a block diagram illustrating the steps of the present invention for querying a database to conduct a synthetic interview.

Turning now to FIG. 5, FIG. 5 is a block diagram illustrating the steps of a method 54 of the present invention for querying a database to conduct a synthetic interview. The method 54 begins at step 56 wherein the query is preprocessed. Preprocessing involves extracting "stop words" and other irrelevant words. Thereafter, in parallel, the preprocessed query is mapped to the interview questions at step 58, to the answers (responses or statements) at step 62, and to the semantic expansions of the questions and answers at step 56. Each of the those mapping steps returns one or more matches together with an associated weight. At step 64, the weights from the results from each of the searches carried out at steps 50, 60, and 62 are compared and the best match identified.

The best match is examined to see if predetermined criteria are met at step 66. For example, the criteria may require that the weight of the best match be greater than a predetermined threshold. The criteria may also determine whether the question has already been asked and answered. If the best match satisfies all of the criteria, then it is retrieved and presented at step 68. If the best match does not satisfy all of the criteria, then an appropriate pool statement is retrieved and presented at step 70.

The results of the method 54 illustrated in FIG. 5 may be stored as state variables at step 72 to keep track of the history of any given interview. The variables may capture information on such things as the current topic of the interview, the length of focus on the topic, the current speaker, etc. The state variables may be fed back to step 66 to ensure that the applicable criteria are being applied.

Figure 6:
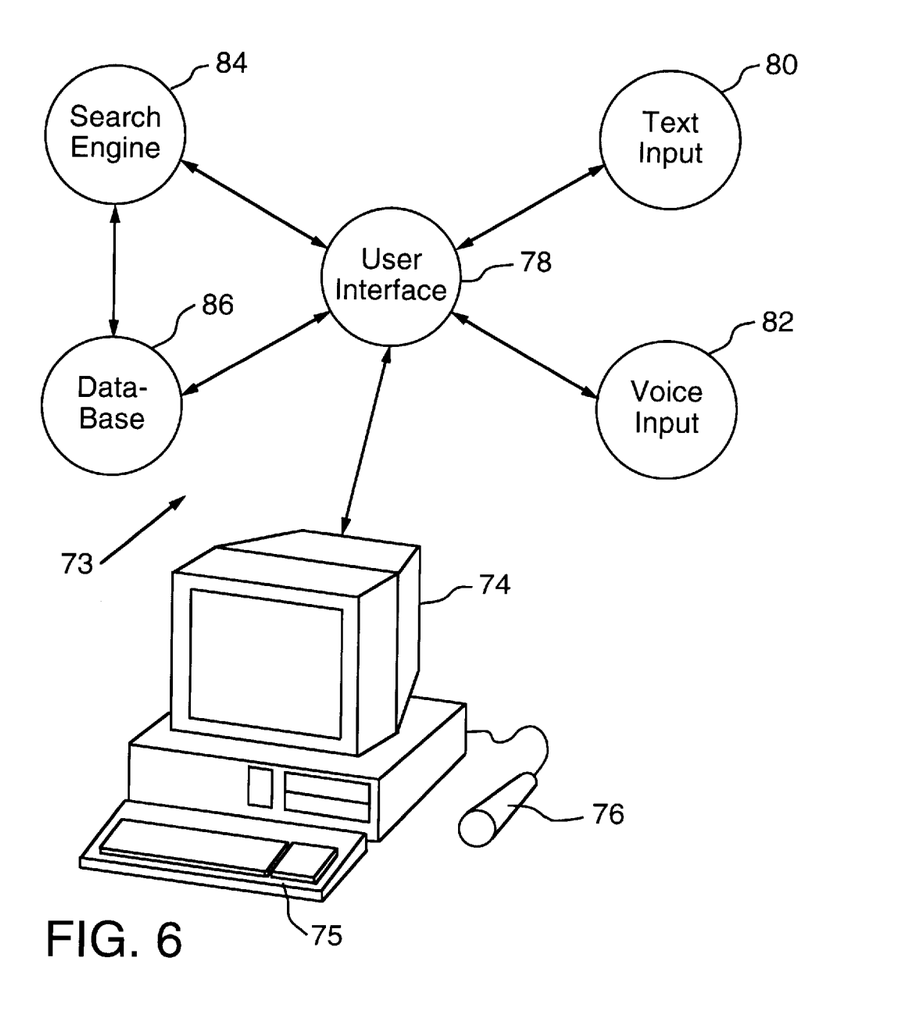
FIG. 6 illustrates an apparatus for conducting a synthetic interview.

In FIG. 6, an apparatus 73 for conducting a synthetic interview is illustrated. The apparatus 73 is comprised of a personal computer 74 capable of receiving input in a known manner from a keyboard 75 and/or a microphone 76. Resident on the personal computer 74, or accessible to the PC through an appropriate network, is a user interface 78, a text input module 80, a voice input module 82, a search engine 84, and a database 86. The user interface 78 receives input from the keyboard 75 or microphone 76 and calls the appropriate text input module 80 or voice input module 82, respectively. The voice input module may be, for example, the Sphinx voice recognition software. The modules 80 and 82 process the received query and provide it in an appropriate form back to the user interface 78 so that the user interface 78 may preprocess the query in accordance with step 56 of method 54 illustrated in FIG. 5.

The user interface 78 invokes the search engine 84, which may be a Pursuit search engine, to search the inverted indices of the database 86 according to steps 58, 60, and 62 of method 54. The search engine 84 identifies a number of matches and the associated weights which are provided back to the user interface 78. The user interface 78 then performs the remainder of the steps of the method 54 illustrated in FIG. 5 such that the appropriate response is retrieved from the database 86 and presented to the user via PC 74.

Figure 7:
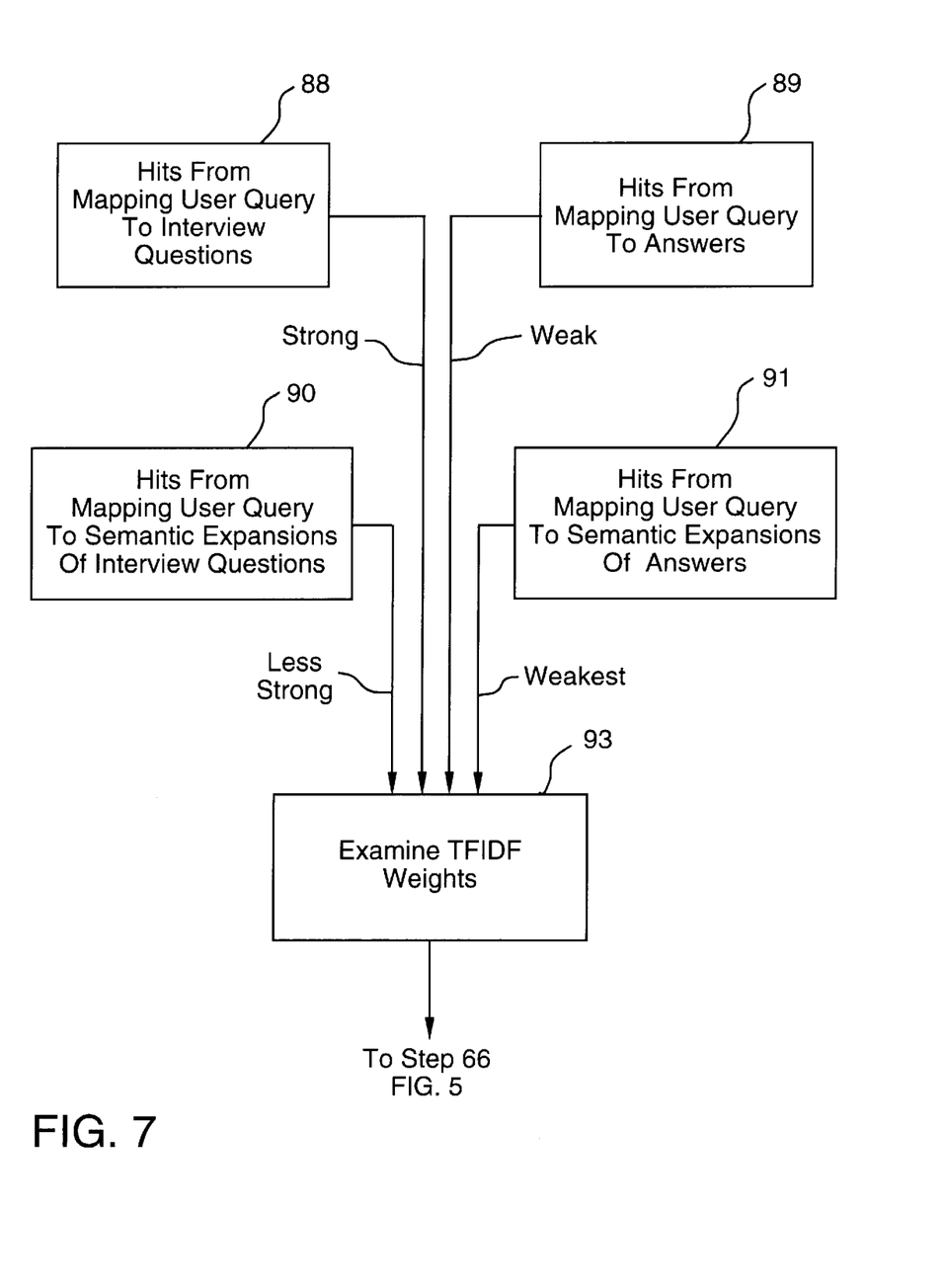
FIG. 7 is a block diagram of an example of how the method illustrated in FIG. 5 is carried out.

An example of how the method 54 of FIG. 5 is carried out by the apparatus 73 of FIG. 6 is illustrated in FIG. 7. FIG. 7 illustrates an example of the context free grammar and statistical search and retrieval of the present invention. As seen in FIG. 7, hits 88 from mapping the user query to interview questions, hits 89 from mapping the user query to the answers, hits 90 from mapping the user query to the semantic expansions of the questions, and hits 91 from mapping the user query to the semantic expansions of the responses are all produced and input to the step 93. Step 93 is similar to step 64 of FIG. 5 where the best match is identified. In step 93, the identification is performed though the examination of the TFIDF weights associated with each of the hits. The hit having the highest weight is passed to step 66 (FIG. 5). Because we are using context-free statistical techniques, if a query is made in one of the translated secondary languages, the appropriate response will still be returned. Because text translations are available, the text translation of the response can also be displayed as a subtitle to the video. That allows a synthetic interview to be accessed in multiple languages simultaneously, with translations presented automatically in the language used for the query.

The use of term frequency inverse document frequency (TFIDF) weighting methods at step 93 is well known. See, for example, Salton, G. et al., "Introduction To Modern Information Retrieval", McGraw-Hill, New York, McGraw-Hill Computer Science Series, 1983. That technique says that keywords that are relatively common in the document, but relatively rare in general, are good indicators of the content of the document. That heuristic may not always be reliable, but is usually quick to compute and serves as a placeholder for more sophisticated techniques. Partial parsing techniques, for example, may be used to improve the analysis of the content.

We additionally apply an empirically derived weight to improve performance. That is accomplished through a higher relevancy weighting of matches to the questions even though there might be a closer statistical match to an expanded answer. For example, assume that the query is "When will Mars be colonized?" Assume that an answer to the question "What countries were colonized last century?" has a very high TFIDF weighting while the question, "When do you think there may be a colony in space?" has a lower TFIDF weighting. By applying an empirically derived weight so that hits from mapping the user query to interview questions are considered to be more relevant (strong) than hits from mapping the user query to answers (weak), then the answer associated with the question "When do you think there may be a colony in space?" will be selected as opposed to the answer associated with the question "What counties were colonized last century?"

The methods and apparatus of the present invention provide a means to converse in depth with a character with a captured sense of a real live person. The user asks questions in plain, conversational English, thus allowing for natural, real-time interaction. In prior art systems, the interfaces are obvious and obtrusive. Such prior art systems focus on branching models (i.e., chose A, B, or C and jump to that video) or search a model representing a list of possible selections (i.e. presenting a list of possible responses for the user to evaluate). The synthetic interview of the present invention represents a substantial advance in making the interface invisible, creating the illusion that the user is simply talking to the computer embodiment of the character. That is accomplished as set forth above, by the integration of speech recognition, natural language understanding, and the interview capture process, all with the goal of returning a singular, appropriate multimedia object. Besides living personalities, synthetic interviews can also use images retrieved from archival footage or be built upon staged recreations of historical or fictitious figures.

While the present invention has been described in conjunction with preferred embodiments thereof, those of ordinary skill in the art will recognize that many modifications and variations are possible. The foregoing disclosure and the following claims are intended to cover all such modifications and variations.

What is claimed is:

1. A computer implemented method of processing recorded data for facilitating a synthetic interview therefrom, comprising the steps of:
   creating a transcript of the recorded data;
   identifying statements in the recorded data;
   associating a question with each of said statements;
   expanding each of said statements and questions with semantic information; and
   creating inverted indices of said questions, said statements, said semantic expansions of said statements, and said semantic expansions of said questions to enable retrieval of the statements.

2. A method of creating a database for facilitating a synthetic interview, comprising the steps of:
   generating questions;
   recording said questions and the responses to said questions;
   creating a transcript of the recorded information;
   maintaining an association between each question and said response thereto;
   expanding said responses and said questions with semantic information;
   creating inverted indices of said questions, said responses, said semantic expansions of said questions, and said semantic expansions of said responses; and
   storing said inverted indices and said recorded information in a database.

3. The method of claim 2 additionally comprising the step of recording generic pool statements for addition to the database.

4. A method of retrieving answers from a database in response to a question, said database containing indexed questions, answers responsive to said questions, and semantic expansions of said questions and answers, comprising the steps of:
   receiving a query;
   searching the indexed questions for matches and associated weights;
   searching the indexed answers for matches and associated weights;
   searching the indexed semantic expansion of the questions for matches and associated weights;
   searching the indexed semantic expansion of the answers for matches and associated weights;
   identifying the best match from the question search, answer search, and semantic expansion searches; and
   displaying the answer associated with the best match.

5. The method of claim 4 additionally comprising the step of preprocessing the received query to extract stop words.

6. The method of claim 4 additionally comprising the step of determining if predetermined criteria are satisfied.

7. The method of claim 6 wherein said database includes pool statements, and wherein said method additionally comprises the step of displaying a pool statement if the predetermined criteria are not satisfied.

8. The method of claim 6 additionally comprising the steps of tracking received queries and best matches therefor, and updating the criteria based on the tracked information.

9. A computer readable medium encoded with a computer program, said computer program for processing recorded data for facilitating a synthetic interview therefrom, said computer program comprising a series of steps for:
   creating a transcript of the recorded data;
   identifying statements in the recorded data;
   associating a question with each of said statements;
   expanding each of said statements and questions with semantic information; and
   creating inverted indices of said questions, said statements, said semantic expansions of said statements, and said semantic expansions of said questions to enable retrieval of the statements.

10. A computer readable medium encoded with a computer program, said computer program for creating a database for facilitating a synthetic interview, said computer program comprising a series of steps for:
    creating a transcript of the recorded information;
    maintaining an association between each question and the response thereto;
    expanding said responses and said questions with semantic information;
    creating inverted indices of said questions, said responses, said semantic expansions of said questions, and said semantic expansions of said responses; and
    storing said inverted indices and said recorded information in a database.

11. A computer readable medium encoded with a computer program, said computer program for retrieving answers from a database in response to a question, said database containing indexed questions, answers responsive to said questions, and semantic expansions of said questions and answers, said computer program comprising a series of steps for:

receiving a query;

searching the indexed questions for matches and associated weights;

searching the indexed answers for matches and associated weights;

searching the indexed semantic expansion of the questions for matches and associated weights;

searching the indexed semantic expansion of the answers for matches and associated weights;

identifying the best match from the question search, answer search, and semantic expansion searches; and displaying the answer associated with the best match.

12. The media of claim 11 wherein said computer program additionally comprises a step for preprocessing the received query to extract stop words.

13. The media of claim 11 wherein said computer program additionally comprises a step for determining if predetermined criteria are met.

14. The media of claim 13 wherein said data base includes pool statements, and wherein said computer program additionally comprises a step for displaying a pool statement if the predetermined criteria are not satisfied.

15. The media of claim 13 wherein said computer program additionally comprises steps for tracking received queries and best matches therefor, and updating the criteria based on the tracked information.

16. An apparatus for retrieving answers from a database in response to a question, said database containing indexed questions, answers responsive to said questions, and semantic expansions of said questions and answers, said apparatus comprising:

means for receiving a query;

means, responsive to said means for receiving, for searching the indexed questions, the indexed answers, the indexed semantic expansion of the questions, and the indexed semantic expansion of the answers for matches and associated weights;

means, responsive to said means for searching, for selecting the best answer to the question; and means for displaying the best answer.

17. The apparatus of claim 16 additionally comprising means for preprocessing the received query to extract stop words.

18. The apparatus of claim 16 additionally comprising means for determining if predetermined criteria are satisfied.

19. The apparatus of claim 18 wherein said database includes pool statements, said apparatus additionally comprising means for displaying one of said pool statements if the predetermined criteria are not satisfied.

20. The apparatus of claim 18 additionally comprising means for tracking queries and best matches therefor, and means for updating the criteria based on the tracked information.

* * * * *